(12) United States Patent
Stone et al.

(10) Patent No.: US 6,597,567 B2
(45) Date of Patent: Jul. 22, 2003

(54) CORNER SUPPORT MEMBERS FOR HOUSING SYSTEM

(75) Inventors: Dennis Stone, Costa Mesa, CA (US); Ralph Laing, Rolling Hills Estates, CA (US); Mathew Duncan, San Clemente, CA (US)

(73) Assignee: Toshiba America Information Systems, Inc., Irvine, CA (US)

( * ) Notice: Subject to any disclaimer, the term of this patent is extended or adjusted under 35 U.S.C. 154(b) by 0 days.

(21) Appl. No.: 09/800,353

(22) Filed: Mar. 5, 2001

(65) Prior Publication Data

US 2002/0122292 A1 Sep. 5, 2002

(51) Int. Cl.[7] .................................................. H05K 7/14
(52) U.S. Cl. .................. 361/683; 312/223.2; 248/188.2
(58) Field of Search ........................ 361/683, 685–687, 361/724–727, 681; 165/104.33, 104.22; 312/253, 255, 223.2, 226.4; 248/188, 188.2, 188.5, 188.6, 151

(56) References Cited

U.S. PATENT DOCUMENTS

| | | | | |
|---|---|---|---|---|
| 5,430,607 A | * | 7/1995 | Smith | 361/683 |
| 5,587,877 A | * | 12/1996 | Ryan et al. | 361/683 |
| 5,833,727 A | * | 11/1998 | Skarsten | 55/385.2 |
| 6,101,087 A | * | 8/2000 | Sutton et al. | 361/686 |
| 6,222,708 B1 | * | 4/2001 | Severson et al. | 361/220 |

* cited by examiner

Primary Examiner—Darren Schuberg
Assistant Examiner—Hung Van Duong
(74) Attorney, Agent, or Firm—Pillsbury Winthrop LLP

(57) ABSTRACT

A housing system includes a rectangular chassis having a front surface, a back surface, a top surface, a bottom surface, and two outer side surfaces. Two front corner feet are adhered to front corners of the rectangular chassis. Two back corner feet are adhered to back corners the rectangular chassis.

38 Claims, 7 Drawing Sheets

CORNER SUPPORT MEMBERS FOR HOUSING SYSTEM

BACKGROUND OF THE INVENTION

1. Field of the Invention

The present invention generally relates to support members for a housing system. More particularly, the present invention relates to weight-bearing corner support members that allow for stacking of multiple housing systems while preventing lateral motion thereof.

2. Discussion of the Related Art

Most electronic devices today, including computer systems and computer appliances, stereo systems, CD or DVD players, and VCR players, are housed in rectangular metal boxes having, usually, four supporting feet members at the bottom of the boxes. The supporting feet members may be formed from the bottom surface of the housing box, as convex projections, for example, or they may be made of a rubber-like material adhered to the bottom surface of the housing box. An advantage of using a rubber-like material as the feet members is that the rubber-like material is less prone to skidding or sliding on surfaces, thus reducing the chance of accidentally knocking an expensive electronic device off a shelf, a counter, a desk, etc.

When a plurality of electronic device boxes are utilized together, in for example, an entertainment system including an amplifier, a tuner, a CD-player, a VCR player, and a DVD-player; or in a computer networking server system where a number of server appliances are utilized together, the boxes for each of these electronic device components making up the entire system are often stacked vertically on top of each other. Because the supporting feet members are typically located on the bottom surface of the housing box for each electronic device component, as more components are stacked on top of each other, the housing box on the bottom of the stack bears the majority of the weight of all the other components stacked on top, usually with the top surface and the bottom surface of the housing box bearing most of the weight. Because the top surface and the bottom surface of the housing boxes of the lower components in a stack are bearing the weight of the components stacked on top, the weight may cause the top and bottom surfaces of the housing boxes onto which they are stacked to bend and become deformed.

The deformations may cause a change in the shape of the housing box, thus altering the internal airflow patterns inside the housing boxes that may adversely affect cooling of the circuitry within the housing boxes. Therefore, critical circuitry within the housing box may fail because of overheating due to the lack of cooling because of the change of the airflow patterns for which a particular electronic device was designed. Moreover, the supporting feet members of a housing box may not provide enough clearance so that when the housing boxes are stacked on top of each other, the top surface of the lower housing box and the bottom surface of the top housing box may not be able to adequately transfer heat generated by the electronic device to the surrounding air.

For computer system components, such as a server appliance or a desktop computer housed within a box, hard disk drive(s) that are housed therein are usually not readily accessible to a user. Typically, in order to remove a hard disk drive from a computer system, the user will be required to remove the housing cover or casing, exposing the internal circuitry of the computer system, unscrew the hard disk drive from a mounting within the box, and disconnect at least the power and data cables from the hard disk drive.

Alternatively, there are removable hard disk drives for computer systems, for example, for a desktop computer or a laptop computer. These hard disk drives are usually housed in a case or cage, so that they may be selectively removed and inserted (usually being "front-loaded" into the computer system), with the power and data wiring of the hard disk drive being connected to pin connectors located on the cage so that the pin connectors may easily couple with reciprocal pin connectors in the desktop computer or laptop computer, or vice versa.

However, there are times when it is not preferable to be known that a hard disk drive is readily removable from a computer system or computer appliance. The hard disk drive of a computer system or computer appliance may be more prone to tampering if it is known that it is readily removable, even if the hard disk drive is locked into the housing of the computer system or appliance. It is preferable to have a hard disk drive that is removable and yet having this feature remain inconspicuous. Additionally, a computer system or appliance may be more aesthetically pleasing if it is not readily noticeable that it has a removable hard disk drive. Moreover, airflow from cooling fans in a computer system or appliance used to cool the circuitry therein typically do not circulate well to removable hard disk drives that are not completely resident internally within the housing of the computer system or appliance.

DETAILED DESCRIPTION

Figure 1:
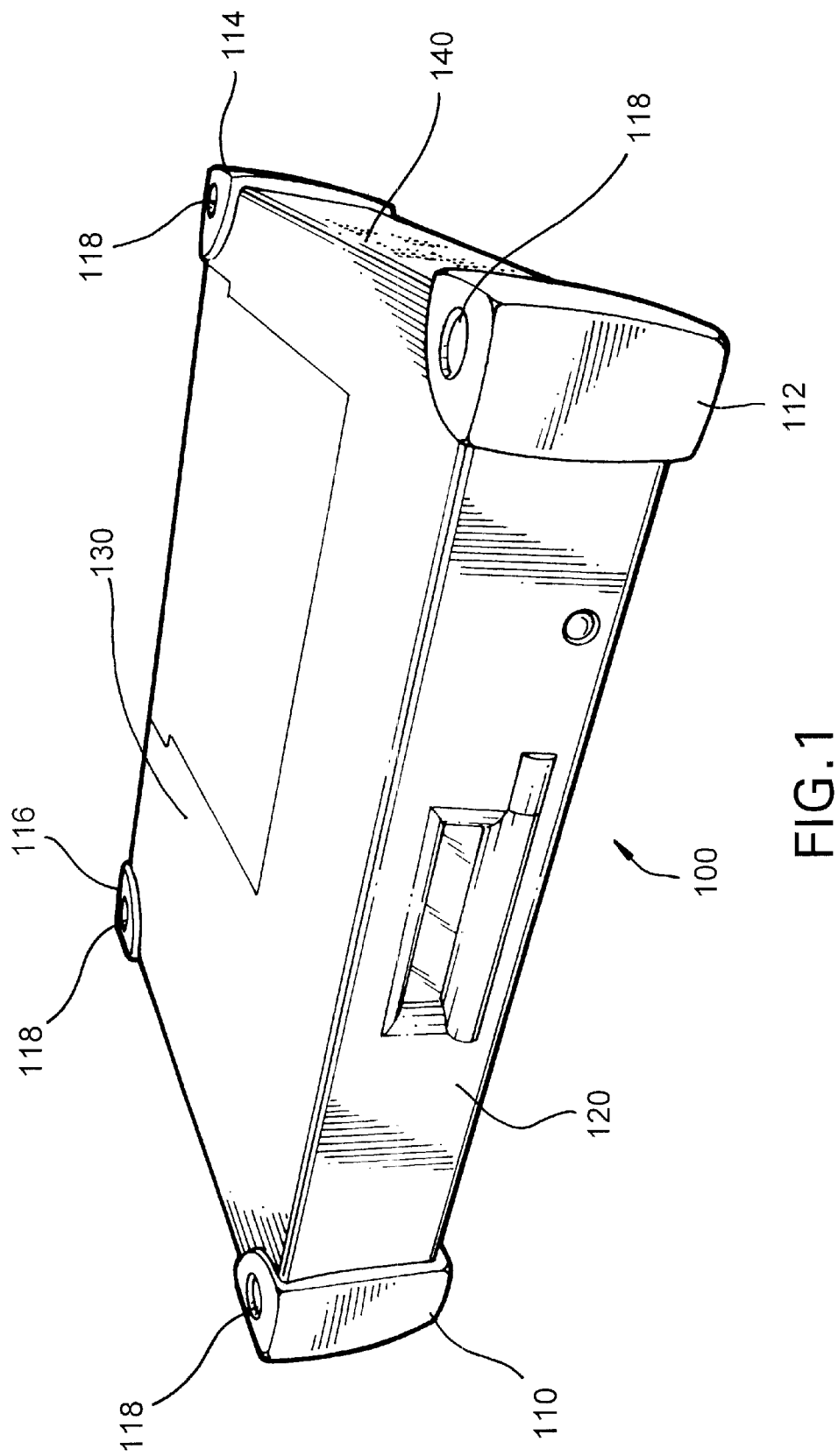
FIG. 1 illustrates a front perspective view of a housing system having corner support members according to an embodiment of the present invention.
Figure 2:
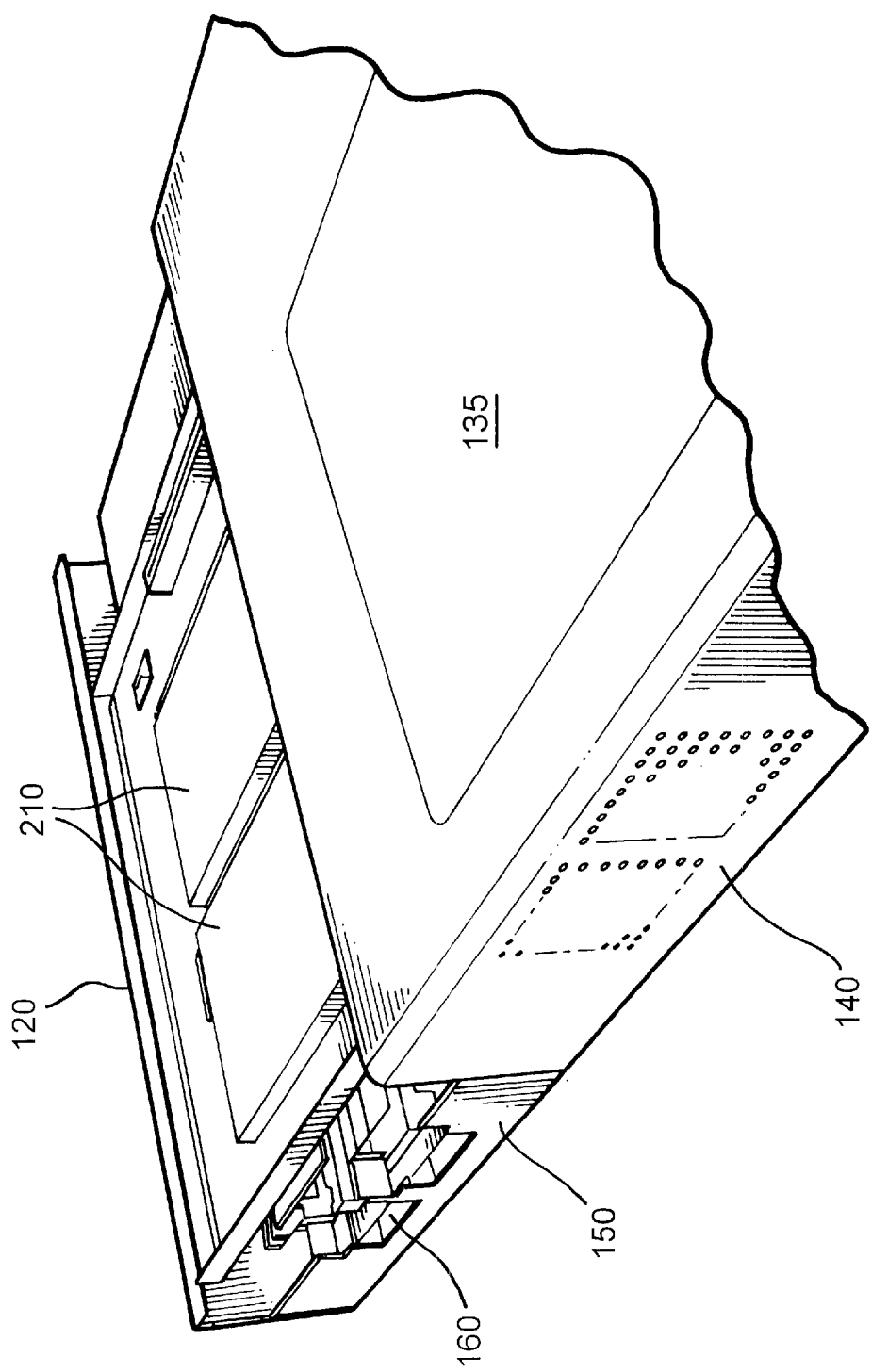
FIG. 2 illustrates a back perspective view of a housing system having a first half chassis and a second half chassis separated therefrom according to an embodiment of the present invention.

FIG. 1 illustrates a front perspective view of a housing system having corner support members according to an embodiment of the present invention. The housing system 100 includes a first half chassis having a front surface 120, a back surface 122 (see FIG. 4), two inner side surfaces 150 (see FIG. 2), and a bottom surface 160 (see FIG. 2). The housing system 100 also includes a second half chassis, having a top surface 130 and two outer side surfaces 140. The first half chassis and the second half chassis are slidably engageable to form the housing system 100. The first half chassis and the second half chassis may be secured by screws or other attachments so that they may not be readily separated without using a tool, so as to discourage users from disassembling the housing system 100 to access, for example, the circuitry contained within the housing system 100. The housing system 100 is preferably utilized to house an electronic system or device, such as a computer system, a server appliance, a CD-player, a DVD-player, a VCR system, etc.

Two front corner feet 110, 112 are adhered to the first half chassis, and two back corner feet 114, 116 are adhered to the second half chassis. The two front corner feet 110, 112 are preferably adhered to the first half chassis at the front surface 120 and the bottom surface 160, while the two back corner feet are preferably adhered to the second half chassis at the top surface 130 and the outer side surface 140. However, the corner feet 110, 112, 114, 116 may be adhered to the chassis in any suitable arrangement, though. The two front corner feet 110, 112 and the two back corner feet 114, 116 may act also as guides and stops for when the first half chassis and the second half chassis are slid together to close and form the housing system 100, and to provide proper alignment of holes for screws, air vents, etc.

The housing system 100 may also be formed from a single rectangular chassis, having a front surface 120, a back surface 122, a top surface 130, a bottom surface 160 (see FIG. 2), and two outer side surfaces 140. In this configuration, the two front corner feet 110, 112 are preferably adhered to the rectangular chassis at the front surface 120 and the bottom surface 160, while the two back corner feet 114, 116 are preferably adhered to the rectangular chassis at the top surface 130 and each of the outer side surface 140. However, the corner feet 110, 112, 114, 116 may be adhered to the rectangular chassis in any suitable arrangement, though.

Figure 3:
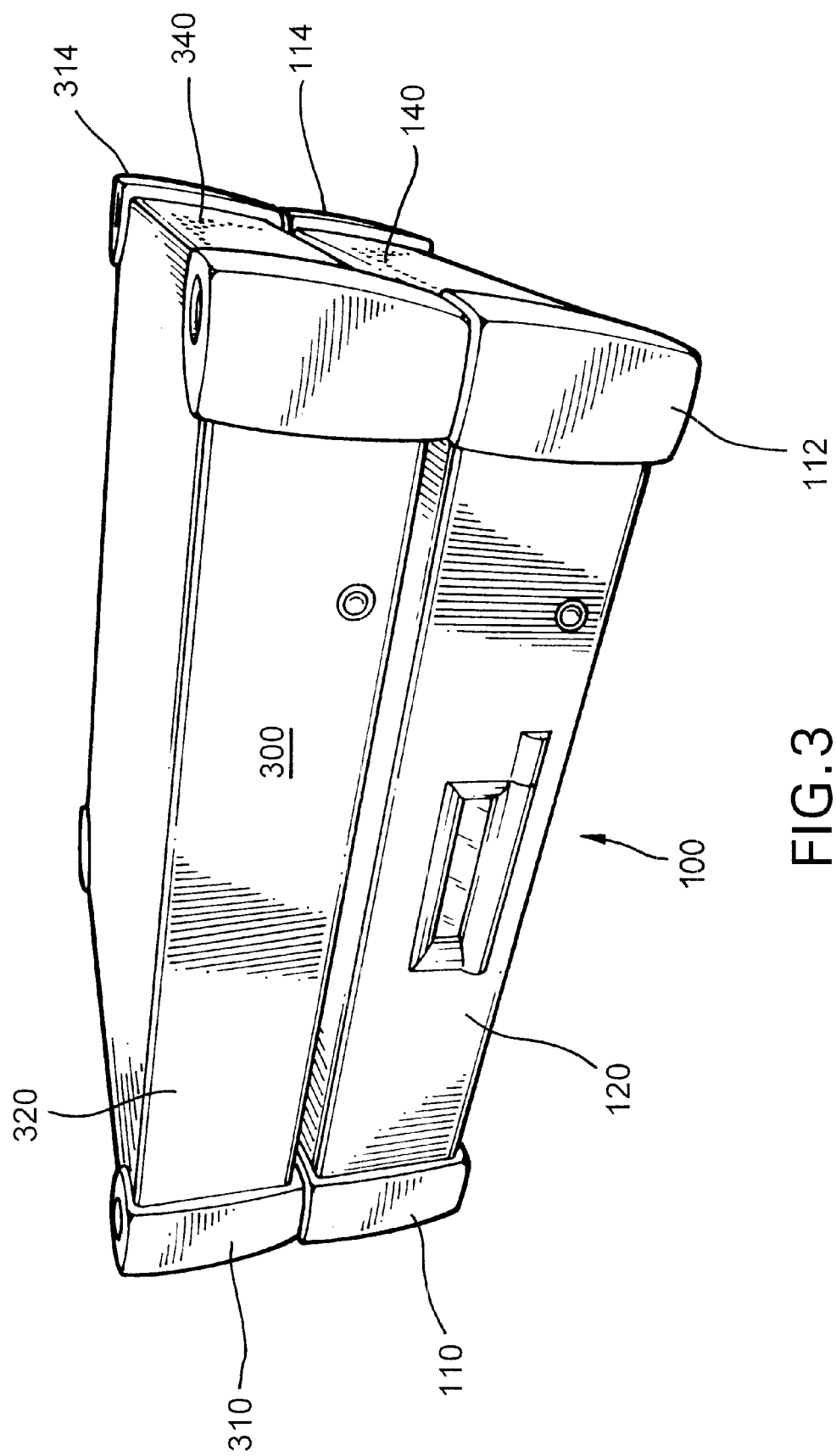
FIG. 3 illustrates a stack of housing systems having corner support members according to an embodiment of the present invention.

The corner feet 110, 112, 114, 116 preferably extend beyond the top and bottom surfaces 130, 160 of the housing system 100 so that when the housing system 100 is placed on a horizontal surface like a table, only the bottom surfaces of the corner feet 110, 112, 114, 116 touch the horizontal surface. Moreover, when a plurality of housing systems 100, 300 (see FIG. 3) are stacked directly on top of each other, the weight of the top housing system 300 (and any subsequent stacks above it), may be supported by the corner feet 110, 112, 114, 116 of each housing system 100, 300 at the corners so that the majority of the entire weight of the top housing system(s) 300 are borne by the corner feet 110, 112, 114, 116 rather than the remaining surfaces (e.g., the top surface 130 and the bottom surface 160, mainly) of the housing system 100. As discussed above, if the weight of a stack of housing systems 100, 300 deforms the surface(s) of the chassis of the housing systems 100, 300, then, this deformation may disrupt the designed cooling airflow within the housing system 100 that is required to cool the circuitry housed within the housing system 100, thus may lead to overheating of the circuitry or any other heat-sensitive element. Moreover, by having the corner feet 110, 112, 114, 116 extend beyond the top and bottom surfaces 130, 160 of the housing system 100, an adequate clearance between the bottom surface of the top housing system 300 in a stack and the top surface 130 of the bottom housing system 100 (not to mention the clearance between the bottom surface 160 of the bottom housing system 100 and the surface upon which it is resting) is achieved to facilitate the transfer of heat generated by the circuitry housed within the housing systems 100, 300.

The corner feet 110, 112, 114, 116 also preferably includes a mating member 118 on a top face of each of the corner feet 110, 112, 114, 116 and a corresponding mating member (not shown) on a bottom face of each of the corner feet 110, 112, 114, 116. As illustrated in FIG. 1, for example, the mating member 118 may be a dimple (a concave indentation), and the corresponding mating member may have a convex indentation that snuggly fits with the mating member 118 so that the top face of a corner feet 110, 112, 114, 116 of a bottom housing system 100 is flush and even with the bottom face of a corner feet 110, 112, 114, 116 of a top housing system 300 (see FIG. 3). However, the mating member 118 and the corresponding mating member may be of any suitable configuration, including using snapping and coupling arrangements, or male and female attachment sets, such as a pin projection and a hollow pin-shaped receiver, a square projection and a square hole receiver, etc. By utilizing the mating members 118 and the corresponding mating members, relative lateral motion may be minimized of a stack of housing systems 100, 300. Moreover, the corner feet 110, 112, 114, 116 are also preferably made of a material, such as rubber, or the like, that provides sufficient traction upon the surface it is placed, or each other when stacked. Therefore, accidental slides or falls of a stack of housing systems 100, 300 too may be minimized. Accordingly, an additional rack structure, used in a stack of network server systems, for example, may be eliminated.

Figure 4:
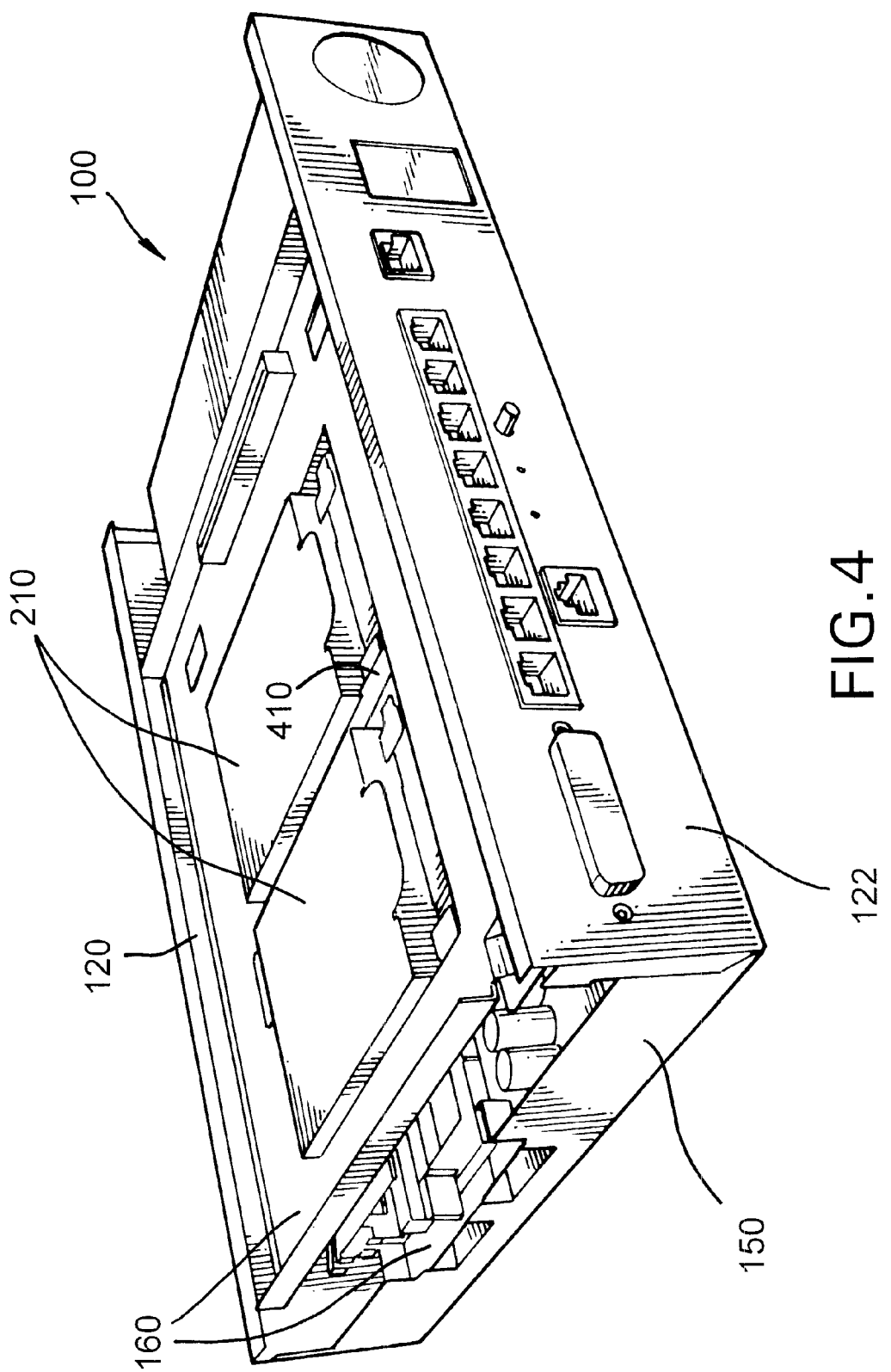
FIG. 4 illustrates an internal view of a system having a hard disk drive tray according to an embodiment of the present invention.

FIG. 4 illustrates an internal view of a system having a hard disk drive tray according to an embodiment of the present invention. The hard disk drive tray 410 may be incorporated into an electronic system or device that utilizes hard disk drives, such as a computer system, a server appliance, a digital video recorder, etc. The hard disk drive tray 410 may be incorporated into a housing system 100 chassis as discussed above with respect to FIGS. 1–3, or any suitable housing arrangement.

The hard disk drive tray 410 accommodates at least one hard disk drive, which is preferably enclosed within a hard disk drive cage 210 that may be selectively removed and inserted into the disk drive tray 410. The hard disk drive cage 210 may be formed of a top half and a bottom half, like "clam shells" enclosing the hard disk drive. The power and data wiring of the hard disk drive are preferably connected to pin connectors on the hard disk drive cage 210 so that the pin connectors may easily couple with reciprocal hard disk drive (HDD) pin connectors 610 (see FIG. 6), or vice versa, forming an electrical connection between the hard disk drive and the circuitry of the electronic system housed within the housing system 100 without the use of ribbon cables to connect the hard disk drive cage 210 to the hard disk drive pin connectors 610. The hard disk drive cage 210 may have openings that serve as vents to allow airflow from a cooling fan(s) (or ambient air) to pass over and under the surfaces of the hard disk drive enclosed therein for cooling.

The hard disk drive tray 410 is preferably isolated, or separated, from the circuitboard and other circuitry of the electronic system housed within the housing system 100. Therefore, access to the hard disk drives is readily available to average users, while access to the circuitboard and other circuitry of the electronic system is restricted. This configuration reduces the opportunity of non-authorized users fiddling around the circuitboard and circuitry and potentially causing damage therein. In this configuration, using the housing system 100 described above and with reference to FIG. 5, a panel 135 may be provided on the top surface 130 of the housing system 100 so that the panel 135 is removable to expose only the hard disk drive tray 410, while the circuitboard and other circuitry of the electronic system housed within the housing system 100 remain inaccessible, for example, by being located below the hard disk drive tray 410 and being separated by a barrier. The hard disk drive tray 410 may be substantially the same size as the top surface of the housing system 100 chassis, or at even larger than that of the panel 135.

However, the housing system 100 utilizing a first half chassis and a second half chassis, as discussed above, for example, may be used to house the disk drive tray 410 as well. Therefore, the hard disk drive tray 410 housed in this two-half chassis configuration would be accessible when the second half chassis having a top surface 130 (which may also include the panel 135) and two outer side surfaces 140 (see FIG. 2) is slidably removed from the first half chassis having a front surface 120, a back surface 122, two inner side surfaces 150, and a bottom surface 160 (see FIG. 4), with the hard disk drive tray 410 and the circuitboard and other circuitry mounted in the first half chassis. As mentioned above, the first half chassis and the second half chassis may be secured by a screw or some other attachment device that requires a tool (or even a special tool), in order to remove. Moreover, the panel 135 may be secured with a set of thumbscrews, for example, with the intent of providing the average user the ability to easily remove the panel 135 to access the hard disk drive tray 410 only (as the remaining circuitry is preferably isolated from the hard disk drive tray 410), while discouraging the user from separating the housing system 100 that exposes the hard disk drive tray 410, along with the circuitboard and other circuitry of the electronic system housed therein. The panel 135 may also be secured to the housing system 100 by latches, screws, or any suitable mechanism.

Figure 6:
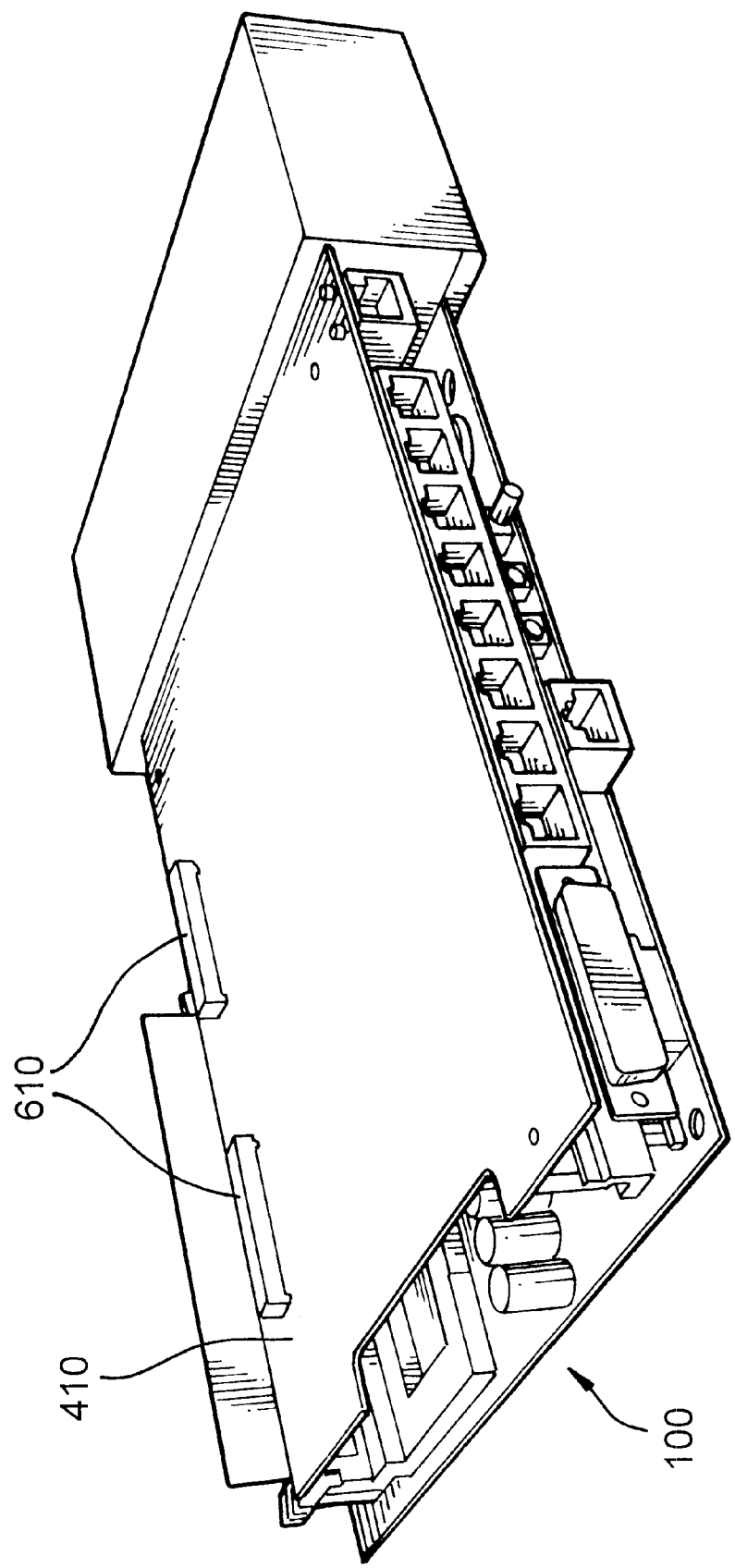
FIG. 6 illustrates an internal view of a system having a hard disk drive tray and hard disk drive connectors according to an embodiment of the present invention.

The hard disk drive tray 410 is preferably positioned near hard disk drive pin connectors 610 (see FIG. 6) adapted to electrically couple with pin connectors of the hard disk drive cage 210. As illustrated in FIG. 6, two sets of hard disk drive connectors 610 are provided in the hard disk drive tray 410, and therefore, the hard disk drive tray 410 according to an embodiment of the present invention is capable of supporting two hard disk drives. However, any number of hard disk drive configurations may be utilized. As illustrated in FIG. 6, the hard disk drive connectors 610 are mounted along one side of a "mezzanine board", which isolates and separates the circuitboard and other circuitry of the electronic system enclosed within the housing system 100 from the hard disk drive tray 410, and ultimately, from the average user. The mezzanine board may have circuitry attached thereto (acting like a circuitboard), preferably on the other side away from the hard disk drive tray 410. By providing the hard disk drive connectors 610 along a side of the mezzanine board, more space is provided to the user to install and remove a hard disk drive cage 210 (by, for example, sliding it in or out of the hard disk drive tray 410), which minimizes the likelihood that the user may damage electrical components during installation and removal of the hard disk drive. Additionally, by providing the hard disk drive tray 410 to be separated from the circuitboard and other circuitry of the electronic system, heat generated by the hard disk drives themselves will not easily transfer into the circuitboard and other circuitry area of the housing system 100.

Figure 7A:
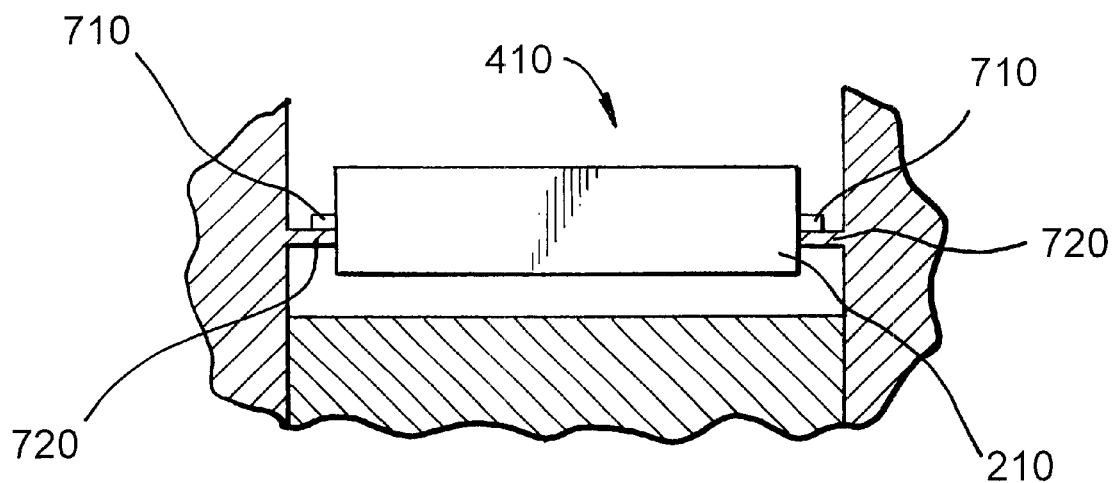
FIG. 7A illustrates a side plan view of a hard disk drive tray according to an embodiment of the present invention.
Figure 7B:
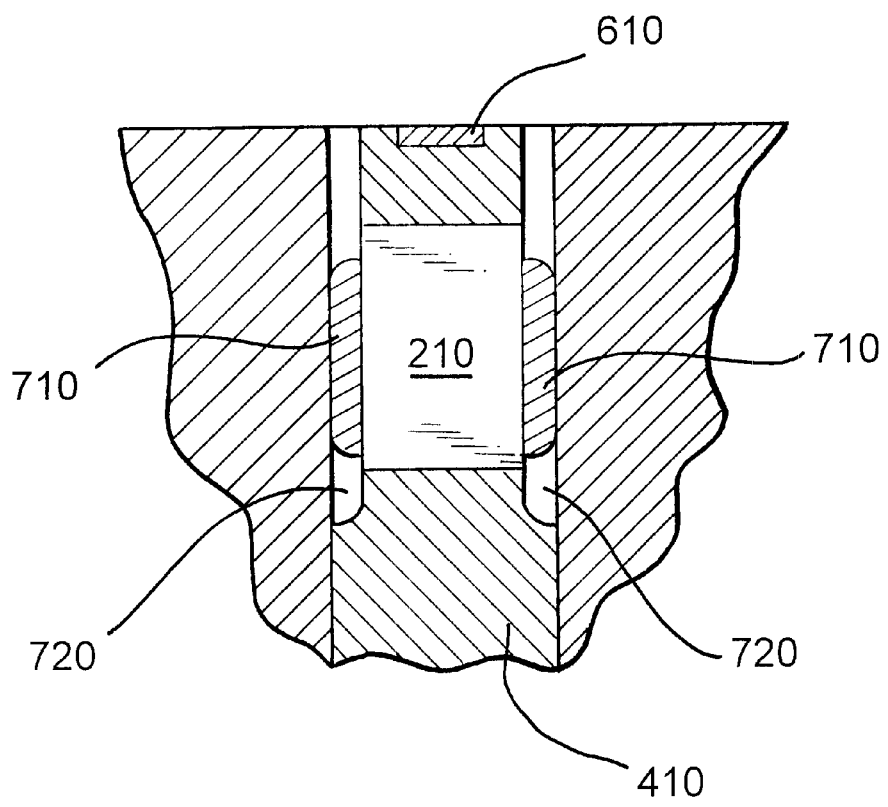
FIG. 7B illustrates a top plan view of a hard disk drive tray according to an embodiment of the present invention.

FIG. 7A illustrates a side plan view of a hard disk drive tray according to an embodiment of the present invention, and FIG. 7B illustrates a top plan view of a hard disk drive tray according to an embodiment of the present invention. The hard disk drive pin connectors 610 are preferably mounted horizontally along its length, so that the hard disk drive may be connected to the electronic system by sliding the hard disk drive cage 210 enclosing the hard disk drive horizontally so that the pin connectors of the hard disk drive cage 210 couple with the hard disk drive connectors 610. The horizontal alignment minimizes the profile of the housing system 100, and thus that of the electronic system.

At least one guiding member 720 is provided on the hard disk drive tray 410 to facilitate installation of the hard disk drive cage 210 into the hard disk drive connectors 610 of the hard disk drive tray 410 via at least one corresponding guiding member 710 of the hard disk drive cage 210. As illustrated in FIGS. 7A and 7B, the corresponding guiding member 710 of the hard disk drive cage 210 may be a rail or slide that may be slidably engageable with the guiding member 720, such as a tab or lip, of the hard disk drive tray 410. In this configuration, the guide members 720 support the hard disk drive cage 210 at its corresponding guide members 710, and provide the proper positioning and alignment for the hard disk drive cage 210 to be easily slid into the hard disk drive tray 410 for electrical connection with the hard disk drive pin connectors 610. Additionally, the hard disk drive pin connectors 610 are preferably (vertically) positioned so that a small gap clearance (e.g., 75 mm) separates the bottom surface of the hard disk drive cage 210 and the mezzanine board, or other partition, so as to allow the heat generated by the hard disk drive to be transferred to the surrounding air without being transferred through the mezzanine board (or other partition), or vice versa into the hard disk drives from the circuitry of the electronic system.

Figure 5:
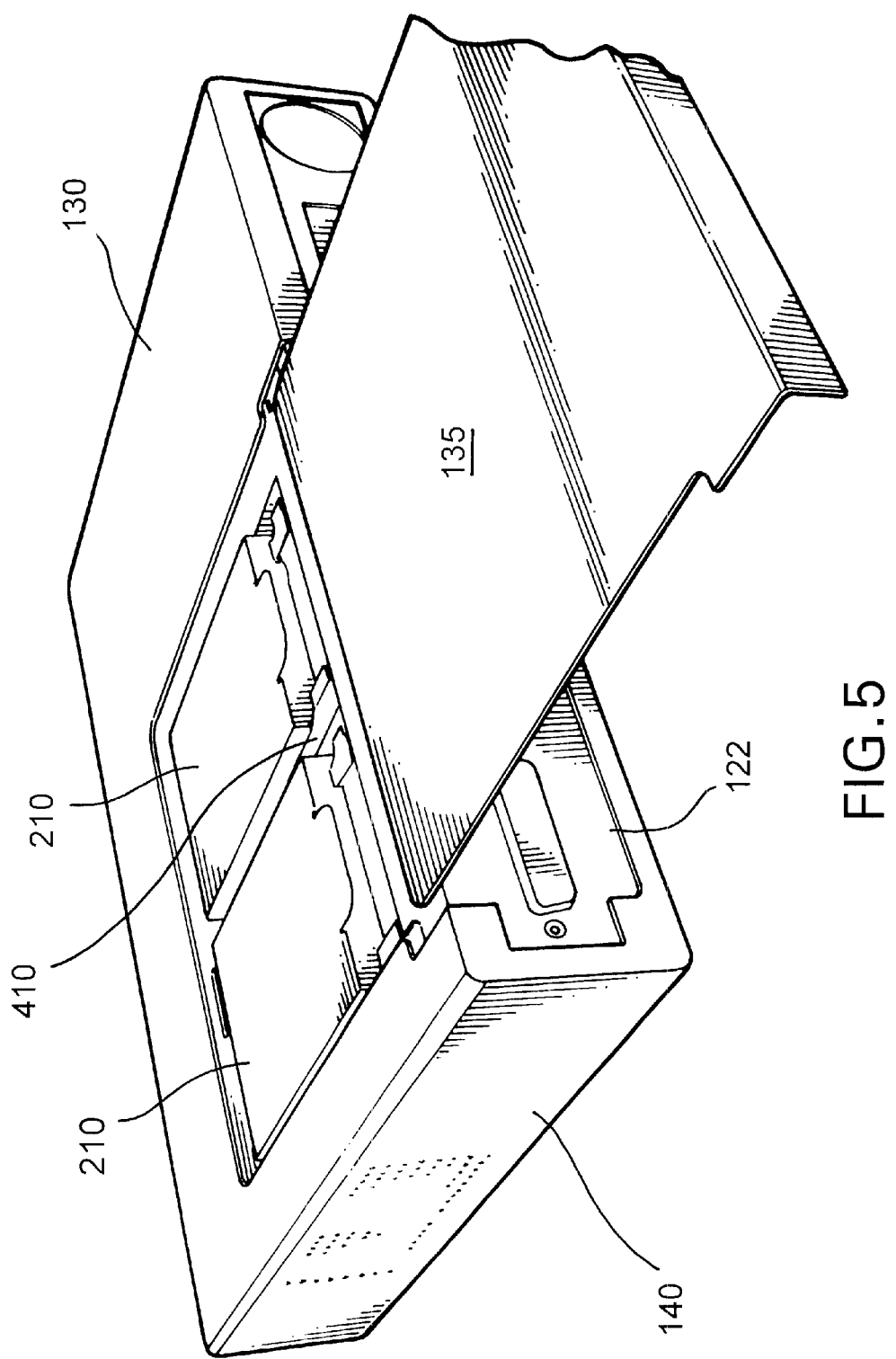
FIG. 5 illustrates a perspective view of a system having a hard disk drive tray and a removable top panel according to an embodiment of the present invention.

As discussed above, the hard disk drives are preferably "top-loaded", that is, they are removed by lifting them out of the hard disk drive tray 410 though the top opening of the top surface of the chassis created by removing the panel 135 (see FIG. 5). The corresponding guiding member 710 on the hard disk drive cage 210 and the guiding member 720 in the hard disk drive tray 410 (along with any other additional lips, tabs, slides, etc.) preferably provides the guidance and alignment so that when the hard disk drive cage 210 is being removed from the hard disk drive pin connectors 610, the pins (either in the hard disk drive connector 610 or in the hard disk drive cage 210 depending on the particular configuration utilized) are not bent in the process. Preferably, the hard disk drive cage 210 slides out horizontally and cannot be lifted out of the hard disk drive tray 410 until the pins are disengaged from the connectors. In this manner, the hard disk drives are concealed from sight to the users, which discourages tampering or removal of the hard disk drives by non-authorized users, and the electronic system looks more aesthetically pleasing.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A housing system, comprising:
   a chassis having a front surface, a back surface, a top surface, a bottom surface, and two outer side surfaces;
   two front corner feet adhered to front corners of the chassis; and two back corner feet adhered to back corners of the chassis, wherein each of the front corner feet extend beyond each of the top surface, the bottom surface, the front surface, and at least one of the two outer side surfaces, and between the top surface and the bottom surface, and each of the back corner feet extend beyond the top surface, the bottom surface, the back surface, and at least one of the two outer side surfaces, and between the top surface and the bottom surface.

2. The housing system according to claim 1, wherein the two front corner feet are adhered to the chassis at the front surface and the bottom surface, and the two back corner feet are adhered to the chassis at the top surface and the two outer side surfaces.

3. The housing system according to claim 1, wherein the housing system encloses an electronic system.

4. The housing system according to claim 1, wherein the two front corner feet and the two back corner feet are weight-bearing members.

5. The housing system according to claim 3, wherein the electronic system is a computer system.

6. The housing system according to claim 5, wherein the computer system is a server.

7. A housing system, comprising:
a rectangular chassis having a front surface, a back surface, a top surface, a bottom surface, and two outer side surfaces;
two front corner feet adhered to front corners of the rectangular chassis; and two back corner feet adhered to back corners the rectangular chassis, wherein
the two front corner feet and the two back corner feet each have a mating member on a top face of the two front corner feet and the two back corner feet, and a corresponding mating member on a bottom face of the two front corner feet and the two back corner feet.

8. The housing system according to claim 7, wherein the mating member is an indentation and the corresponding mating member is a projection.

9. A housing system, comprising:
a first half chassis having a front surface, a back surface, two inner side surfaces, and a bottom surface;
a second half chassis having a top surface and two outer side surfaces;
two front corner feet adhered to front corners of the first half chassis; and
two back corner feet adhered to back corners of the second half chassis, wherein the first half chassis and the second half chassis are engageable to form the housing system.

10. The housing system according to claim 9, wherein the two front corner feet are adhered to the first half chassis at the front surface and the bottom surface, and the two back corner feet are adhered to the second half chassis at the top surface and the two outer side surfaces.

11. The housing system according to claim 9, wherein the two front corner feet and the two back corner feet project beyond the top surface and the bottom surface of the housing system.

12. The housing system according to claim 9, wherein the two front corner feet and the two back corner feet act as guides to allow proper alignment for engagement of the first half chassis and the second half chassis to form the housing system.

13. The housing system according to claim 9, wherein the housing system encloses an electronic system.

14. The housing system according to claim 9, wherein the two front corner feet and the two back corner feet are weight-bearing members.

15. The housing system according to claim 13, wherein the electronic system is a computer system.

16. The housing system according to claim 15, wherein the computer system is a server.

17. A housing system, comprising:
a first half chassis having a front surface, a back surface, two inner side surfaces, and a bottom surface;
a second half chassis having a top surface and two outer side surfaces;
two front corner feet adhered to front corners of the first half chassis; and
two back corner feet adhered to back corners of the second half chassis, wherein the first half chassis and the second half chassis are engageable to form the housing system, wherein
the two front corner feet and the two back corner feet each have a mating member on a top face of the two front corner feet and the two back corner feet, and a corresponding mating member on a bottom face of the two front corner feet and the two back corner feet.

18. The housing system according to claim 17, wherein the mating member is an indentation and the corresponding mating member is a projection.

19. A stack of a plurality of housing systems, comprising:
a first housing system including,
a first rectangular chassis having a first front surface, a first back surface, a first top surface, a first bottom surface, and two first outer side surfaces,
two first front corner feet adhered to first front corners of the first rectangular chassis, and
two first back corner feet adhered to first back corners of the first rectangular chassis; and
a second housing system including,
a second rectangular chassis having a second front surface, a second back surface, a second top surface, a second bottom surface, and two second outer side surfaces,
two second front corner feet adhered to second front corners of the second rectangular chassis, and
two second back corner feet adhered to second back corners of the second rectangular chassis,
wherein the two first front corner feet, the two first back corner feet, the two second front corner feet, and the two second back corner feet each have a mating member on a top face of each corner feet and a corresponding mating member on a bottom face of each corner feet, the second housing system being stacked on top of the first housing system with the mating member of each of the two first front corner feet and the two first back corner feet being engaged with the corresponding mating member of each of the two second front corner feet and the two second back corner feet.

20. The stack of the plurality of housing systems according to claim 19, wherein the mating member is an indentation and the corresponding mating member is a projection.

21. The stack of the plurality of housing systems according to claim 19, wherein weight of the second housing system is borne by the two first front corner feet and the two first back corner feet of the first housing system.

22. The stack of the plurality of housing systems according to claim 19, wherein each of the housing systems enclose an electronic system.

23. The stack of the plurality of housing system according to claim 19, wherein the two first front corner feet and the two first back corner feet are weight-bearing members bearing weight of the second housing system.

24. The stack of the plurality of housing systems according to claim 22, wherein the electronic system is a computer system.

25. The stack of the plurality of housing systems according to claim 24, wherein the computer system is a server.

26. A housing system comprising:
   a chassis having a top surface, a bottom surface, and at least one lateral surface joined to at least one of said top surface and said bottom surface; and
   a foot adhered to said at least one lateral surface and one of said top surface and said bottom surface, a portion of said foot extending beyond said top surface and said bottom surface.

27. The housing system according to claim 26, said at least one lateral surface including a front surface, a back surface, and at least one side surface, wherein three of said top surface, said bottom surface, said front surface, said back surface and said at least one side surface meet at a corner, and further wherein said foot is located proximate said corner.

28. The housing system according to claim 26, said foot having a top face with an indentation.

29. The housing system according to claim 28, said foot having a bottom face with a projection adapted to fit within said indentation.

30. A system of stacked electronic devices, said system comprising:
   an upper electronic device having a first outer housing with a first top surface and a first bottom surface, and at least one first foot coupled to one of said first top surface and said first bottom surface, a portion said at least one first foot extending beyond said first bottom surface; and
   a lower electronic device having a second outer housing with a second top surface and a second bottom surface, and at least one second foot coupled to one of said second top surface and said second bottom surface, said at least one second foot receiving said portion of said at least one first foot such that said first bottom surface is not in contact with said second top surface.

31. The system according to claim 30, wherein a weight of said upper electronic device is supported by said at least one second foot.

32. The system according to claim 30, wherein said at least one first foot includes a projection and said at least one second foot includes an indentation.

33. The system according to claim 30, wherein said second top surface is made of a flexible material.

34. The system according to claim 30, wherein said at least one second foot extends beyond said second bottom surface such that said second bottom surface is raised above a supporting surface upon which the system of stacked electronic devices rests.

35. A method of stacking a plurality of devices, said method comprising:
   placing a first device on a supporting surface, said first device having a first top surface, a first bottom surface and a plurality of first feet, such that said plurality of feet contact the supporting surface to raise said bottom surface;
   placing a second device above said first device, said second device having a second bottom surface and a plurality of second feet, such that said second bottom surface is raised above said first top surface; and
   mating a first member on at least one of said plurality of first feet with a second mating member on at least one of said plurality of second feet.

36. The method according to claim 35, further including, by said plurality of first feet, supporting substantially the entire weight of said first device.

37. The method according to claim 35, further including maintaining a pattern of air flow through said first device.

38. The method according to claim 35, wherein said first member is an indentation and said second member is a projection.

* * * * *